United States Patent
Shoji et al.

(10) Patent No.: US 7,697,846 B2
(45) Date of Patent: Apr. 13, 2010

(54) METHOD FOR CHANGING FREQUENCY AND BASE STATION IN RADIO OPTICAL FUSION COMMUNICATION SYSTEM

(75) Inventors: Yozo Shoji, Tokyo (JP); Hiroyo Ogawa, Tokyo (JP); Yoshihiro Hashimoto, Tokyo (JP)

(73) Assignees: National Institute of Information and Communications Technology, Incorporated Administrative Agency, Tokyo (JP); Sumitomo Osaka Cement Co., Ltd., Tokyo (JP)

( * ) Notice: Subject to any disclaimer, the term of this patent is extended or adjusted under 35 U.S.C. 154(b) by 796 days.

(21) Appl. No.: 10/590,518

(22) PCT Filed: Feb. 21, 2005

(86) PCT No.: PCT/JP2005/003238

§ 371 (c)(1),
(2), (4) Date: Dec. 7, 2006

(87) PCT Pub. No.: WO2005/083915

PCT Pub. Date: Sep. 9, 2005

(65) Prior Publication Data

US 2007/0206957 A1    Sep. 6, 2007

(30) Foreign Application Priority Data

Feb. 26, 2004    (JP) .............................. 2004-052303

(51) Int. Cl.
*H04B 10/00*    (2006.01)
*H04B 10/04*    (2006.01)

(52) U.S. Cl. ...................... 398/115; 398/183; 398/186; 398/201

(58) Field of Classification Search ................... 398/79, 398/91, 95, 115, 186, 201, 183; 372/18, 372/19, 26; 359/278
See application file for complete search history.

(56) References Cited

U.S. PATENT DOCUMENTS

| | | | |
|---|---|---|---|
| 6,211,996 B1 * | 4/2001 | Fuse | 359/278 |
| 6,674,969 B1 * | 1/2004 | Ogusu | 398/79 |
| 2002/0146046 A1 * | 10/2002 | Kim et al. | 372/20 |

FOREIGN PATENT DOCUMENTS

| | | | |
|---|---|---|---|
| JP | 2000-310800 A | 11/2000 | |
| JP | 2002-135211 A | 5/2002 | |

* cited by examiner

*Primary Examiner*—Quan-Zhen Wang
(74) *Attorney, Agent, or Firm*—Birch, Stewart, Kolasch & Birch, LLP

(57) ABSTRACT

In a radio optical fusion communication system with the integration of an optical fiber transmission path and a radio propagation path, wherein by first and second light sources, an intermediate-frequency signal generating means for generating a modulating signal at an intermediate frequency band, a modulator for modulating an optical signal from the first light source into an SSB modulated optical signal using the intermediate-frequency signal, and an optical mixer for mixing the modulated optical signal with the optical signal from the second light source to obtain an optical transmission signal in a base station, the frequency of either of the optical signals is controlled such that the difference in frequency between the optical signals is a desired frequency of a modulated radio signal, thus switching the frequency channel of the modulated radio signal in the radio propagation path.

10 Claims, 10 Drawing Sheets

METHOD FOR CHANGING FREQUENCY AND BASE STATION IN RADIO OPTICAL FUSION COMMUNICATION SYSTEM

TECHNICAL FIELD

The present invention relates to a radio optical fusion communication system with the integration of optical fiber transmission and radio communication, and in particular, relates to a technique for changing a radio frequency in the radio optical fusion communication system.

BACKGROUND ART

The present inventors have researched and proposed a radio optical fusion communication system with an integration of optical fiber transmission and a radio communication. Particularly, in a method proposed by the present inventors, optical signals are generated using a first laser light source and a second laser light source of different wavelengths, the first optical signal is modulated into an unsuppressed-carrier single-sideband (SSB) or double-sideband (DSB) modulated optical signal using an intermediate-frequency signal, the modulated signal is mixed with the second optical signal, and the resultant optical signal is transmitted.

The optical signal is opto-electrically converted to generate an unmodulated carrier and a modulated radio signal. In a radio propagation path, upon receiving, multiplication components of the unmodulated carrier and the modulated radio signal are obtained to extract an intermediate-frequency converted signal and the signal is then demodulated.

In the above-described self-heterodyne transmission method, a received signal can be stably reproduced. In addition, signals can be transmitted from a base station to an antenna station over a several-km optical fiber transmission path with low loss. Accordingly, a preferred communication system can be realized.

FIG. 10 is a diagram of the structure of a radio optical fusion communication system based on the above-described method. As shown in the diagram, the system includes a base station (100), a remote antenna station (110), and a receiving terminal (120). The base station (100) is connected to the remote antenna station (110) via an optical fiber transmission path (130). The remote antenna station (110) is connected to the receiving terminal (120) via a radio propagation path (131).

The base station (100) includes a first laser light source (101) for single-mode oscillation at an oscillation frequency f1 (Hz), a second laser light source (102) for single-mode oscillation at an oscillation frequency f2 (Hz), and an intermediate-frequency signal generator (103) for generating an intermediate-frequency modulating signal, which is modulated based on information signal data to be transmitted.

An intermediate-frequency signal having an intermediate frequency f_m (Hz) generated from the intermediate-frequency signal generator (103) is supplied as a modulating signal to an optical modulator (104) in the base station (100). The optical modulator (104) modulates a first optical signal from the first laser light source (101) into signal light. In this structure, a suppressed-carrier optical single-sideband (optical SSB) modulator is used as the optical modulator (104). Accordingly, an image suppressed signal with carrier is obtained.

A second optical signal from the second laser light source (102) is supplied to an optical mixer (105) without being modulated. The optical mixer (105) mixes the second optical signal with the optical signal supplied from the optical modulator (104). An optical spectrum (140) in the optical fiber transmission path (130) is shown in the figure. In other words, the spectrum includes a second optical signal (141) having the frequency f2 (Hz), a first optical signal (142) having the frequency f1 (Hz), and a modulating signal (143) having a frequency f1+f_m (Hz).

In the remote antenna station (110) connected to the base station via the optical fiber transmission path (130), an opto-electric transducer (111) performs squared detection on the received optical signal. An amplifier (112) amplifies the resultant signal. The amplified signal is released from an antenna (113) into the air.

A spectrum (144) of this radio signal is shown in the figure. In other words, the signal is an image suppressed signal with a carrier frequency of f1-f2 (Hz) (e.g., a millimeter-wave frequency).

In the present method, the remote antenna station (110) does not need a radio-frequency filter for eliminating a lower sideband and the receiving terminal (120) does not require an oscillator, leading to a reduction in cost.

In the receiving terminal (120), the signal is received through an antenna (121) and is supplied to an amplifier and a band pass filter which are not shown. A detector (122) detects the signal using squared detection and supplies the detected signal to a signal demodulator (123). Multiplication two components of an unmodulated carrier (145) and a modulated radio signal component (146) of the radio signal (144) is obtained, so that an intermediate-frequency signal is reproduced. The intermediate-frequency signal is supplied to the signal demodulator (123) and is then demodulated, thus obtaining the information signal data.

To utilize the above-described radio optical fusion communication system in a multi-cell environment, it is preferred to reuse frequencies and switch a radio frequency channel in terms of interference between adjacent cells. However, there is no proposed method for switching a radio frequency channel.

The present invention is made in consideration of problems of the above-described related art and an object of the present invention is to provide a technique for easily switching a radio frequency channel at high speed.

DISCLOSURE OF INVENTION

To accomplish the above object, a frequency changing method according to the present invention has the following features:

According to the invention described in Claim 1, there is provided a method in a radio optical fusion communication system including a base station and a remote antenna station, the base station generating a modulated radio signal, electro-optically converting the generated signal into an optical signal while the modulation mode is kept, and transmitting the converted signal to the remote antenna station over an optical fiber path, the remote antenna station opto-electrically converting the received optical signal to extract the modulated radio signal and transmitting the signal through an antenna by radio.

In this system, the base station includes a first light source and a second light source for generating optical signals of different frequencies, an intermediate-frequency signal generating means for generating a modulating signal at an intermediate frequency band, a modulator for modulating the optical signal from the first light source into an unsuppressed-carrier single-sideband (SSB) or double-sideband (DSB) modulated optical signal using the intermediate-frequency signal, and an optical mixer for mixing the modulated optical signal with the optical signal from the second light source to obtain an optical transmission signal.

According to the present invention, with this arrangement, the frequency of at least one of the optical signals from the first and second light sources is controlled so that the difference in frequency between the optical signals is a desired frequency of the modulated radio signal, thereby being switched the frequency channel of the modulated radio signal extracted by the remote antenna station.

In the method for changing a frequency according to Claim 2, the frequency of the optical signal from at least one of the first and second light sources is shifted through an optical frequency shifter provided downstream of the light source.

According to the invention described in Claim 3, the optical frequency shifter in the above-described Claim 2 has optical waveguides including a main Mach-Zehnder integrated with two sub Mach-Zehnders, the optical frequency shifter is driven in accordance with a predetermined frequency oscillation signal for determination of the amount of frequency shift, and the frequency is shifted as much as the frequency of the oscillation signal by changing a voltage applied to the optical frequency shifter such that the optical waveguides have predetermined phase differences therebetween.

In the method for changing a frequency according to Claim 4, the predetermined phase difference between the waveguides in each sub Mach-Zehnder is set to $+\pi$ or $-\pi$, a voltage is applied such that the predetermined phase difference between the waveguides in the main Mach-Zehnder is reversed between $+\pi/2$ and $-\pi/2$, and the frequency of the optical signal from the light source is shifted in each of upper and lower sidebands as much as the predetermined frequency, thus obtaining the amount of frequency shift that is twice as much as the predetermined frequency.

Alternatively, as disclosed in Claim 5, the predetermined phase difference between the waveguides in the main Mach-Zehnder is set to $+\pi/2$ or $-\pi/2$, a voltage is applied such that the predetermined phase difference between the waveguides in each sub Mach-Zehnder is reversed between $+\pi$ and $-\pi$, and the frequency of the optical signal from the light source is shifted in each of upper and lower sidebands as much as the predetermined frequency, thus obtaining the amount of frequency shift that is twice as much as the predetermined frequency.

According to the invention defined in Claim 6, the applied voltage may include a pulse train having a predetermined pulse frequency, pulse pattern, and pulse voltage to hop the frequency of the modulated radio signal.

As another mode of frequency hopping, as described in Claim 7, the predetermined frequency oscillation signal for determination of the amount of frequency shift may be hopped to hop the frequency of the modulated radio signal.

According to the present invention, a base station utilizing the method for changing a frequency in the above-described radio optical fusion communication system can be provided.

BEST MODE FOR CARRYING OUT THE INVENTION

An embodiment disclosed as the best mode for carrying out the present invention will now be described with reference to the drawings. The embodiment is not limited to the following example.

Figure 1:
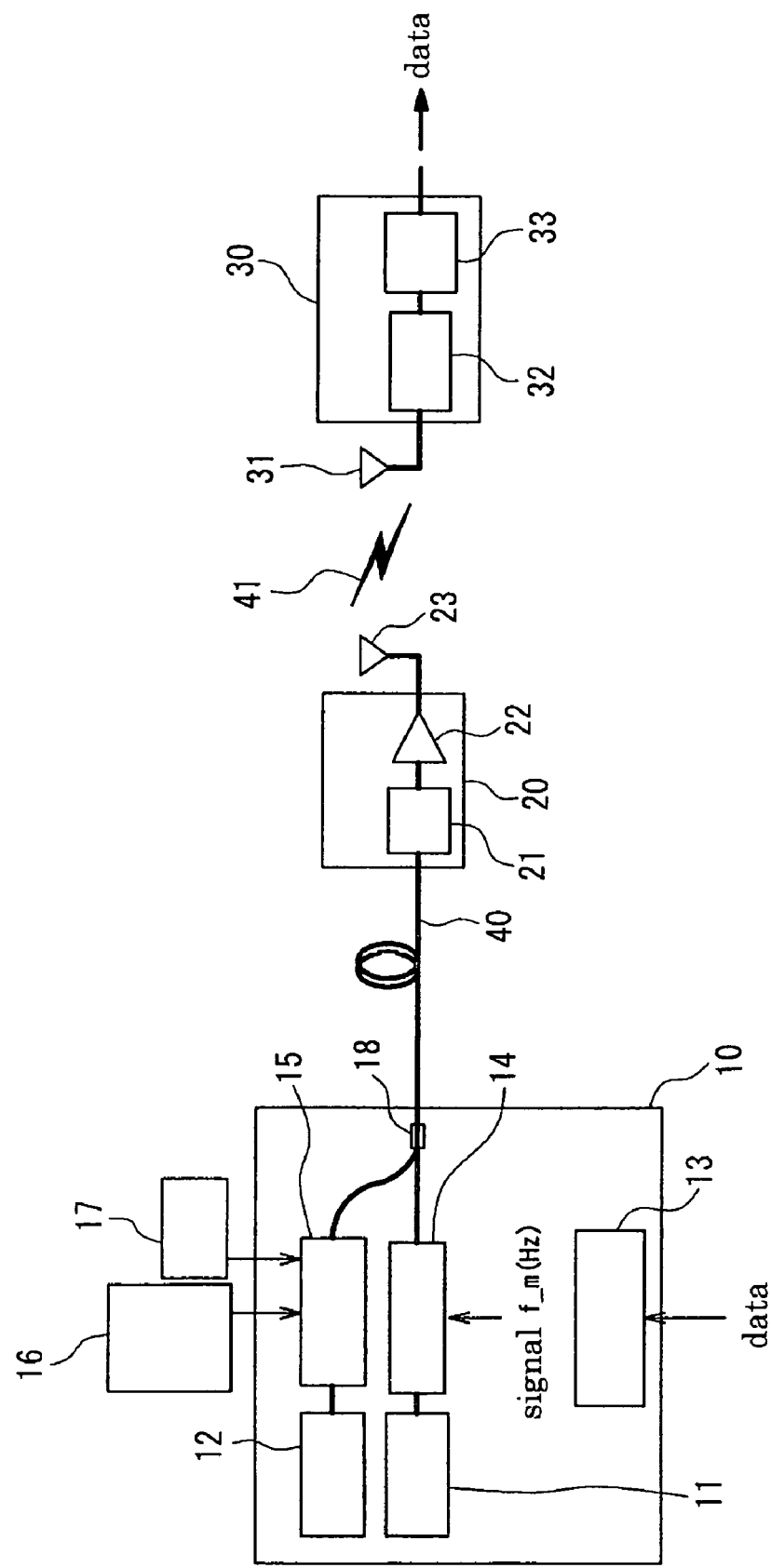
FIG. 1 is a diagram of the structure of a radio optical fusion communication system according to the present invention.

FIG. 1 shows the entire structure of a radio optical fusion communication system according to the present invention. Fundamental elements of the system are the same as those in the structure shown in FIG. 10. In other words, the system includes a base station (10), a remote antenna station (20), and a receiving terminal (30). The base station (10) is connected to the remote antenna station (20) via an optical fiber transmission path (40). The remote antenna station (20) is connected to the receiving terminal (30) via a radio propagation path (41).

As described above, the base station (10) includes a first laser light source (11) for single-mode oscillation at an oscillation frequency f1 (Hz), a second laser light source (12) for oscillation at an oscillation frequency f2 (Hz), an intermediate-frequency signal generator (13), and a suppressed-carrier optical single-sideband (optical SSB) modulator (14). According to the present invention, additionally, an optical frequency shifter (15) is located immediately downstream of the second laser light source (12).

Figure 10:
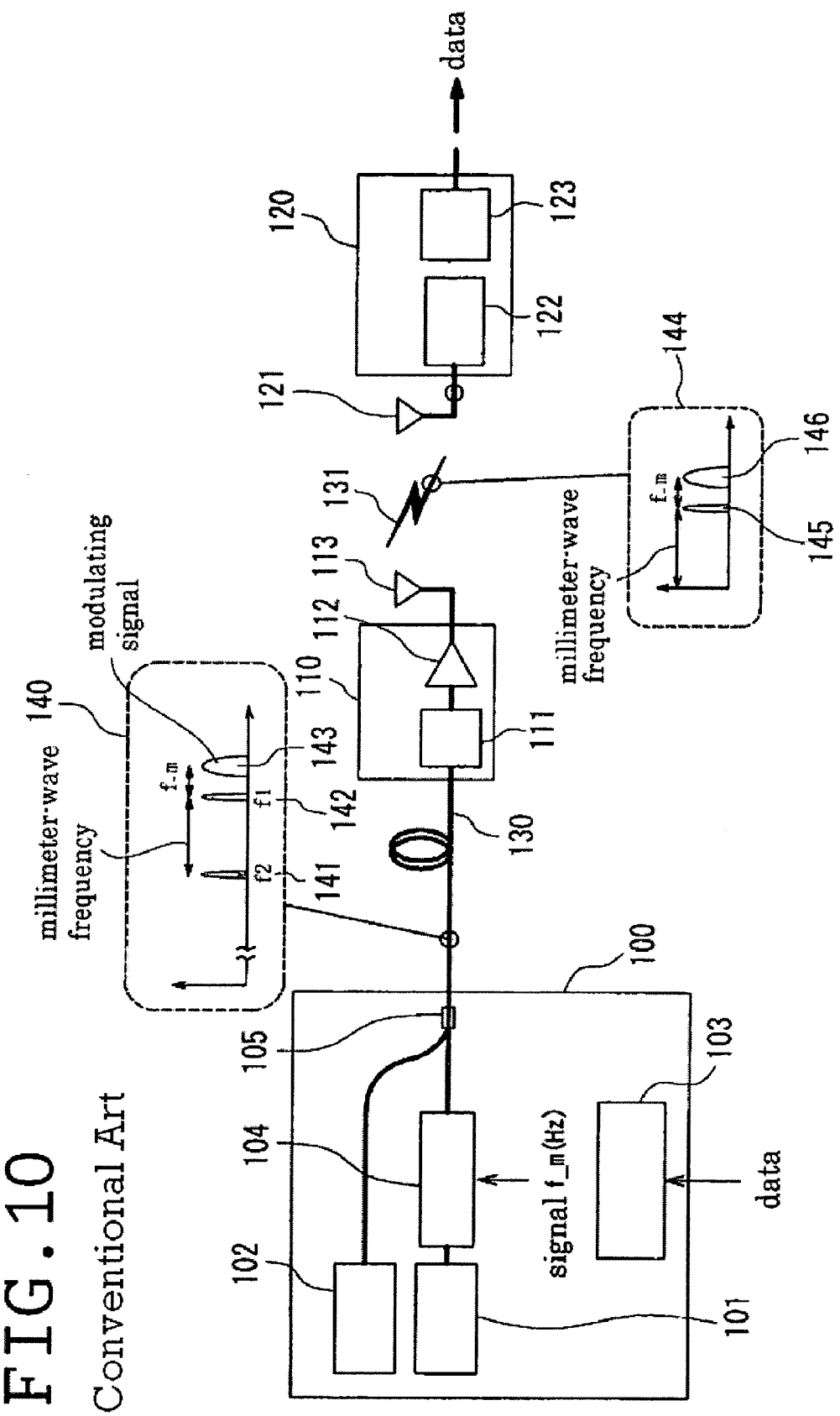
FIG. 10 is a diagram of the structure of a conventional radio optical fusion communication system.

The structure of the remote antenna station (20) and that of the receiving terminal (30) are the same as those in FIG. 10. The remote antenna station (20) includes an opto-electric transducer (21) for detecting a received optical signal using squared detection, an amplifier (22), and an antenna (23). The receiving terminal (30) includes an antenna (31), an amplifier, a band pass filter, a detector (32), and a signal demodulator (33), the amplifier and band pass filter being not shown in the diagram.

The present invention provides a technique for changing a radio frequency in a radio propagation path and proposes a technique for changing a radio frequency by utilizing the advantages of a self-heterodyne transmission method related to the present invention and shifting optical frequencies of the first and second laser light sources (11) and (12).

In other words, according to the present invention, a millimeter-wave band is assumed as a radio frequency band. Devices operating at the millimeter wave band are expensive. Additionally, it is difficult to develop such a device operating with high stability. Accordingly, a technique for switching a radio frequency channel with high stability at high speed is required.

In the use of the self-heterodyne transmission method, since the difference in optical frequency between two laser light sources becomes a radio frequency in a radio propagation path, it is possible to switch a radio frequency channel without using a millimeter-wave device. The present invention is made in consideration of the above-described features and proposes a technique for changing an optical frequency which has not been proposed in conventional systems based on the self-heterodyne transmission method.

In the simplest possible mode, it is considered that the oscillation frequency of either the first laser light source (11) or the second laser light source (12) may be changed. Since the difference between the oscillation frequency f1 (Hz) and the oscillation frequency f2 (Hz) becomes a radio frequency channel, when the oscillation frequency of, e.g., the first laser light source (11) increases, the radio frequency also increases, therefore, it can be possible to switch the channel.

Figure 2:
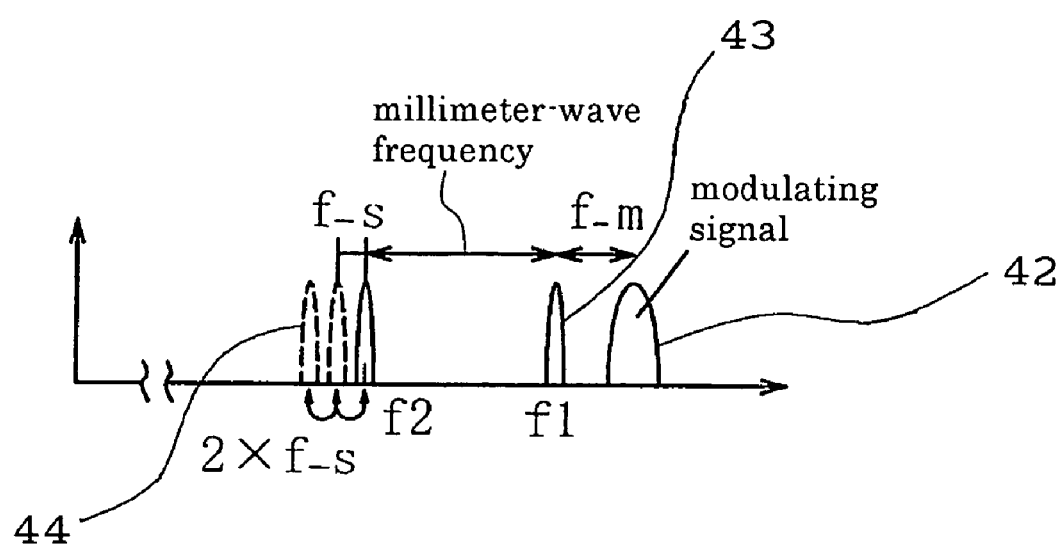
FIG. 2 shows an optical spectrum in an optical fiber transmission path.

The above-described fact will be described in detail with reference to FIGS. 2 and 3 in detail. FIG. 2 shows an optical spectrum in the optical fiber transmission path (40). After an optical mixer (18) mixes optical signals, the optical spectrum represents the frequency distribution of a modulating signal (42) having a frequency f1+f_m (Hz), an oscillation signal (43) having an oscillation frequency f1 (Hz), and an oscillation signal (44) having an oscillation frequency f2 (Hz). The modulating signal (42) is deviated from the oscillation signal (43) as much as an intermediate frequency and the oscillation signal (43) is deviated from the oscillation signal (44) as much as a millimeter-wave frequency in the radio propagation path. Therefore, when the oscillation signal (44) is shifted by, e.g., an amount of f_s (Hz), the frequency of each of the modulating signal (42) and the oscillation signal (43) is also shifted by the same amount.

Figure 3:
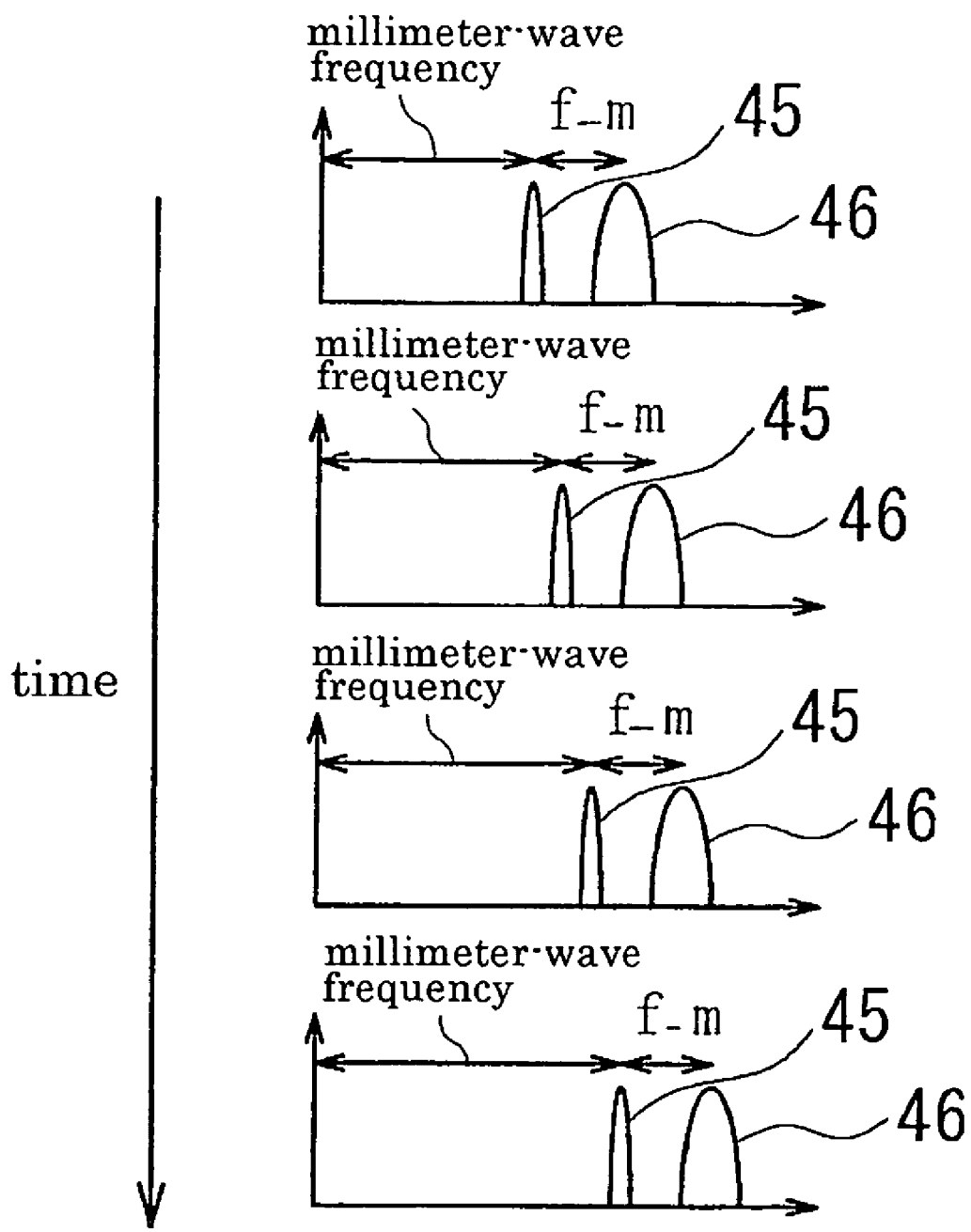
FIG. 3 shows spectra of modulated radio signals.

In the radio propagation path (41), as shown in FIG. 3, a carrier component (45) and a modulated signal component (46) are propagated in the millimeter-wave band. A frequency in the millimeter-wave band is similarly shifted by the amount of f_s (Hz). In other words, both of the carrier component and the signal component are arbitrarily shifted in accordance with the amount of shift given by the optical frequency shifter.

Figure 4:
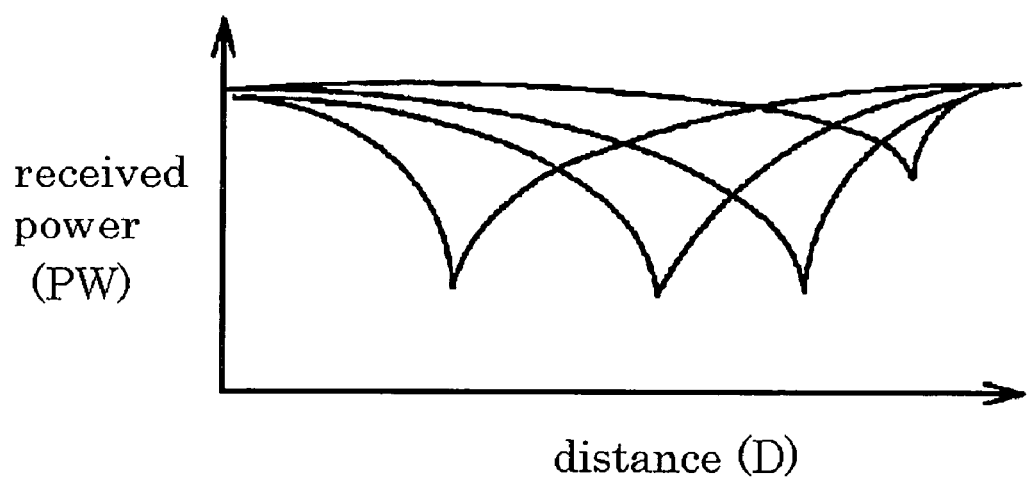
FIG. 4 is a graph showing the characteristics of received power in a receiver.

Regarding the characteristics of received power, a plurality of radio waves including the same information reach the receiving terminal in a multi-path environment as shown in FIG. 4. Disadvantageously, received power (PW) remarkably attenuates according to the phase relation between received signals. In particular, regarding a radio signal with a high frequency, e.g., a millimeter-wave frequency, even if the distance (D) between a transmitting antenna and a receiving terminal is slightly changed, the phase relation between received signals easily varies. This may lead to a reduction in received power. It is, therefore, difficult to provide seamless communication. However, so long as a radio frequency carrier is hopped at a high rate and received signals including the same information and having different distance characteristics are combined, even when signals are received equivalently in any distance, a reduction in received power can be prevented.

According to the current technique, in order to change the oscillation frequency of a semiconductor laser, it is necessary to control temperature with high accuracy or mechanically control the length of a laser oscillator with high accuracy. These control operations are not necessarily easy. In the most appropriate mode, therefore, it is preferred that the optical frequency shifter (15) be disposed immediately downstream of the second laser light source (12) or the first laser light source (11).

Figure 5:
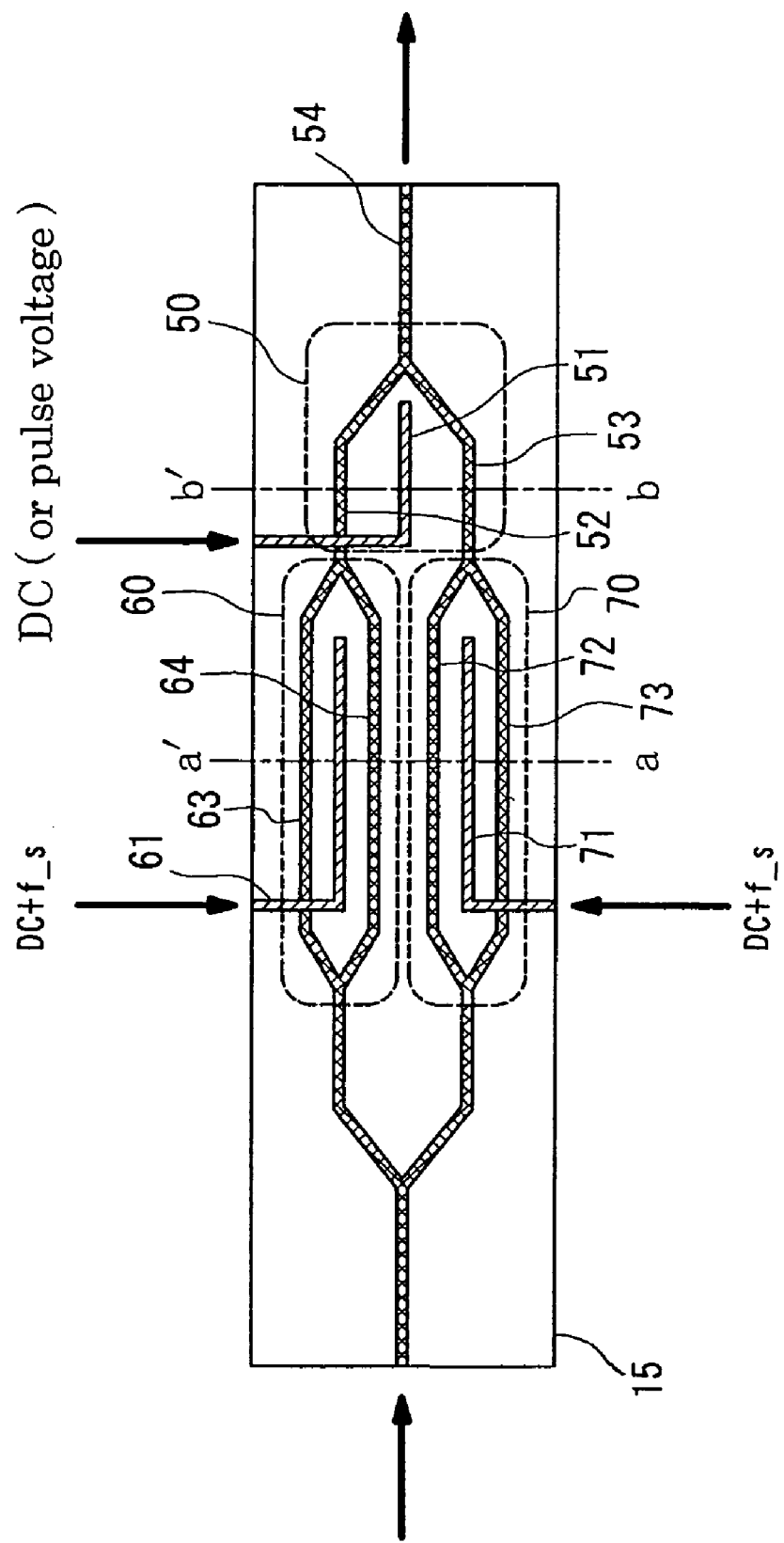
FIG. 5 is a plan view of an optical frequency shifter according to the present invention.
Figure 6:
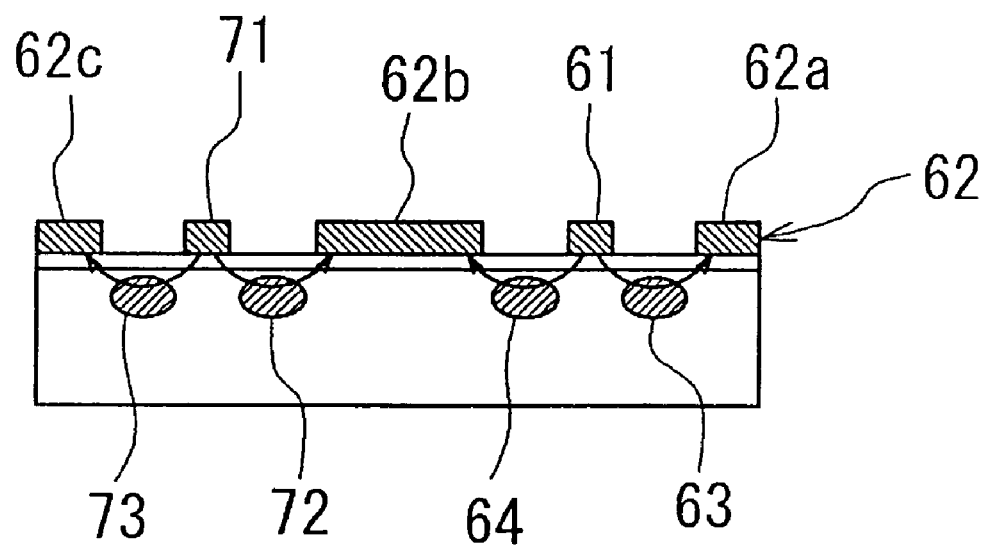
FIG. 6 is a cross-sectional view of the optical frequency shifter according to the present invention at the line a-a'.
Figure 7:
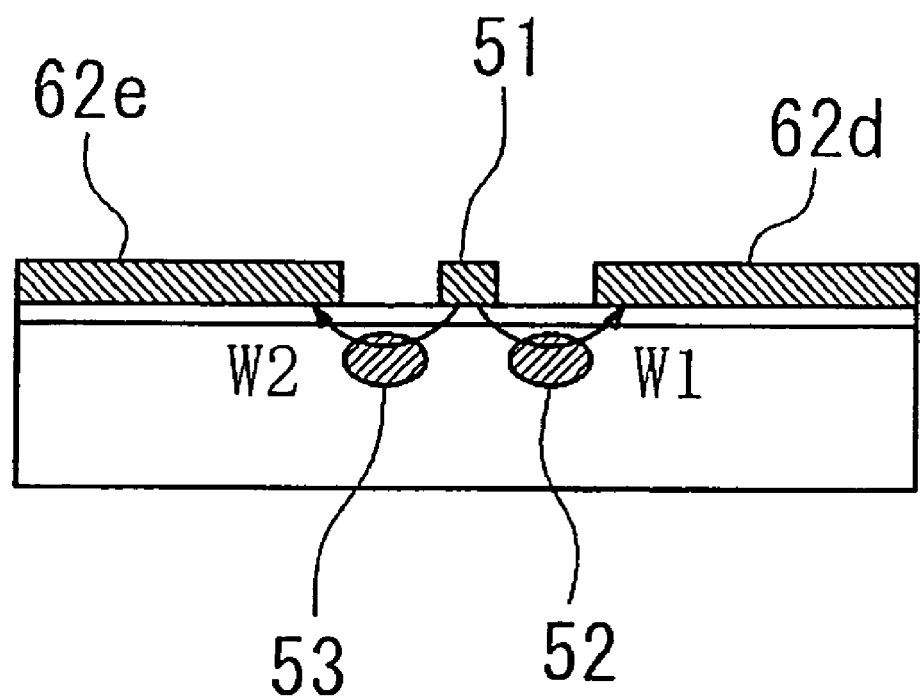
FIG. 7 is a cross-sectional view of the optical frequency shifter according to the present invention at the line b-b'.

The structure of the optical frequency shifter (15) will now be described in detail with reference to FIGS. 5 to 7. FIG. 5 is a plan view of the optical frequency shifter (15), FIG. 6 is a cross-sectional view at the line a-a', and FIG. 7 is a cross-sectional view at the line b-b'. The present optical frequency shifter (15) is called an X-cut LN modulator made of lithium niobate. The optical frequency shifter (15) includes optical waveguides, constituting a main Mach-Zehnder (MMZ) (50) and two sub Mach-Zehnders (SMZs) (60) integrated therewith, RF+DC electrodes (Hot) (61) and (71), serving as two ports, and a DC electrode (Hot) (51), serving as one port. It is unnecessary to form each RF+DC electrode as one port. In each sub Mach-Zehnder, an RF electrode and a DC electrode may be arranged in series as two ports.

As shown in FIGS. 6 and 7, in the sub Mach-Zehnders (60) and (70), GND electrodes (62) are arranged on both the sides of each of the RF+DC electrodes (61) and (71) such that the surface of a substrate is covered with the GND electrodes (62). Consequently, a magnetic field is generated from each RF+DC electrode to the associated GND electrodes, i.e., between the RF+DC electrode (61) and a GND electrode (62a), between the RF+DC electrode (61) and a GND electrode (62b), between the RF+DC electrode (71) and the GND electrode (62b), and the RF+DC electrode (71) and a GND electrode (62c). At that time, a DC voltage is applied so that an optical phase difference of $\pi$ is provided between optical waveguides (63) and (64) arranged in the substrate between the electrodes and, similarly, an optical phase difference of $\pi$ is provided between optical waveguides (72) and (73).

A DC power supply (16), connected to the optical frequency shifter (15), applies a DC voltage thereto. Individual voltages can be applied to three electrodes, i.e., the RF+DC electrodes (61) and (71) and the DC electrode (51), which will be described below.

In addition, an RF oscillation signal having an RF frequency f_s (Hz), corresponding to the amount of frequency shift, is supplied to each of the RF+DC electrodes (61) and (71) so that the oscillation frequency f2 (Hz) of the second laser light source (12) produces an optical component shifted by an amount of f_s (Hz). The RF oscillation signal is generated from a microwave oscillator (17) which is connected to the optical frequency shifter (15).

Referring to FIG. 7, the DC electrode (51) is disposed at the center of the main Mach-Zehnder (50) and GND electrodes (62d) and (62e) are arranged on both sides of the DC electrode (51). An optical waveguide (52) which is formed by combination of the optical waveguides (63) and (64), and an optical waveguide (53) which is formed by combination of the optical waveguides (72) and (73) are arranged in the substrate such that the optical waveguide (52) is located between the electrodes (51) and (62d) and the optical waveguide (53) is located between the electrodes (51) and (62e).

When a voltage is applied to the DC electrode (51), the oscillation frequency, shifted by the amount of f_s (Hz), to an upper sideband (i.e., by an amount of +f_s) or to a lower sideband (i.e., by an amount of −f_s) is obtained thereby. In other words, a voltage is supplied to the DC electrode (51) so that the following induced phase shifts in the following Table are performed in the optical waveguides W1 (52) and W2 (53) during upper-sideband shifting or lower-sideband shifting.

| OPTICAL WAVEGUIDE | UPPER-SIDEBAND SHIFTING | LOWER-SIDEBAND SHIFTING |
|---|---|---|
| W1 (52) | $-\pi/4$ | $+\pi/4$ |
| W2 (53) | $+\pi/4$ | $-\pi/4$ |

The detailed description will now be given below.

Figure 8:
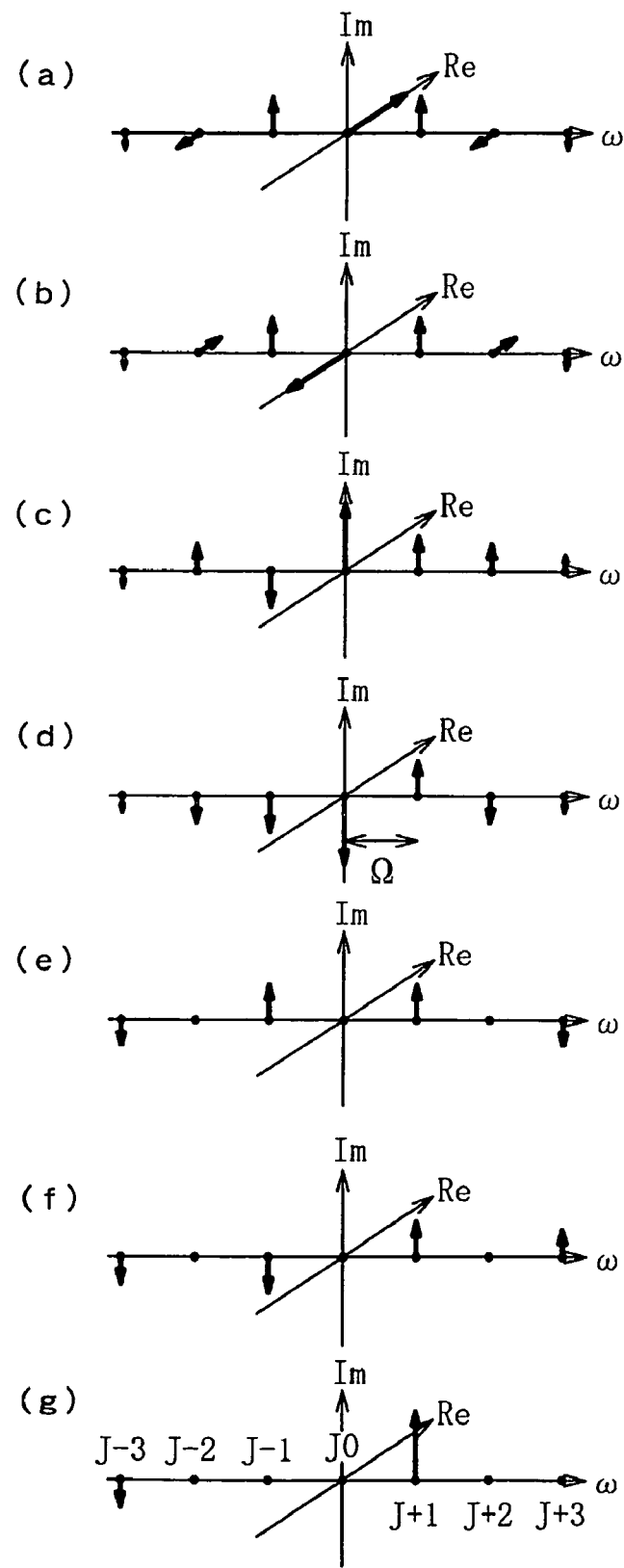
FIG. 8 shows the states of optical components in respective optical waveguides.
Figure 9:
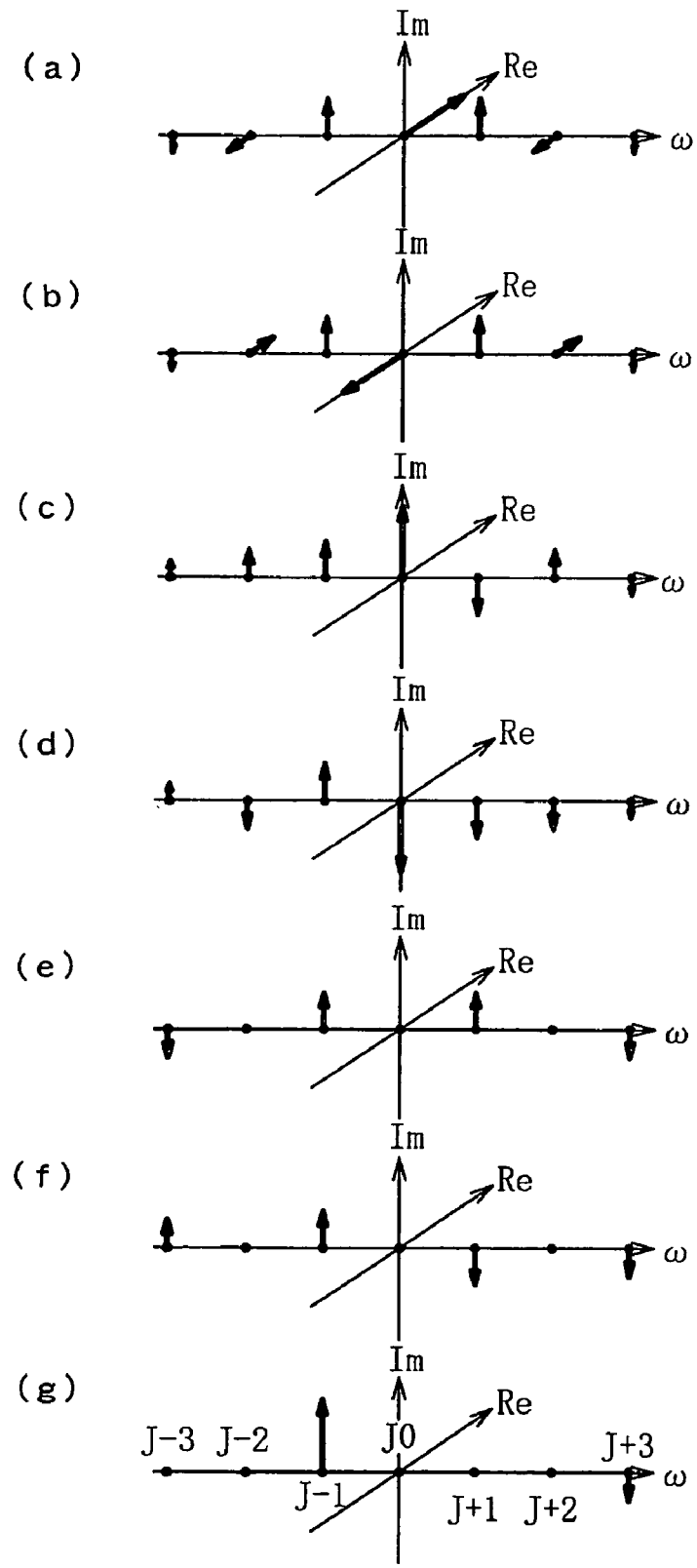
FIG. 9 shows the states of optical components in respective optical waveguides.

Referring to FIGS. 8 of (a) to (g) and 9 of (a) to (g) show optical components in the optical waveguides (63), (64), (72), (73), (52), (53), and an optical waveguide (54), respectively. The optical waveguides (52) and (53) are combined into the optical waveguide (54). FIG. 8 shows the optical components upon upper-sideband shifting. In FIG. 8, (a) shows the optical component in the optical waveguide (63), (b) shows that in the optical waveguide (64), (c) shows that in the optical waveguide (72), (d) shows that in the optical waveguide (73), (e) shows that in the optical waveguide (52), (f) shows that in the optical waveguide (53), and (g) shows that in the optical waveguide (54). FIG. 9 shows the optical components upon lower-sideband shifting. In FIG. 9, (a) shows the optical component in the optical waveguide (63), (b) shows that in the optical waveguide (64), (c) shows that in the optical waveguide (72), (d) shows that in the optical waveguide (73), (e) shows that in the optical waveguide (52), (f) shows that in the optical waveguide (53), and (g) shows that in the optical waveguide (54).

As shown in the figures, by controlling the RF transmission signal supplied to each of the RF+DC electrodes (61) and (71), the phases of the optical components (a) and (b) and those of the optical components (c) and (d) of FIG. 8 and those of the optical components (a) and (b) and those of the optical components (c) and (d) of FIG. 9 can be shifted by the amount of $\pi$, respectively.

In addition, controlling a voltage applied to the DC electrode (51) provides a phase difference of $\pi/2$ between the optical components (e) and (f) of FIG. 8 and provides a phase difference of $-\pi/2$ between the optical components (e) and (f) of FIG. 9.

In the optical waveguide (54) on the output side, therefore, a component segment J+1 is enhanced in the optical component (g) of FIG. 8, so that the shifted component having the same frequency stability as that of the supplied RF signal can be extracted.

Since there is an inverse relationship between the optical components (g) of FIGS. 8 and 9 with respect to a component segment J0, a component segment J−1 is enhanced in FIG. 9.

With the above-described structure, the shift amount equal to the frequency of an input RF signal can be provided between a shifting portion using the optical frequency shifter and a non-shifting portion. In addition, the shift amount that is twice as much as RF frequency can be obtained.

In other words, in the use of the above-described principle, when a voltage applied to the DC electrode (51) is changed such that the states are switched between those of FIGS. 8 and 9, the frequency shift amount that is twice as much as the RF frequency f_s as shown in FIG. 2 can be obtained easily.

The realization of double shift can increase the efficiency of frequency shift and also prevent an increase in $V\pi$ with increase in RF frequency. Advantageously, the burden of controlling optical modulation index can be drastically reduced. Generally, the control has to be performed each frequency change.

The optical frequency shifter (15) may be disposed immediately downstream of the first laser light source (11), i.e., between the first laser light source (11) and the optical modulator (14). When the optical frequency shifter (15) is disposed immediately downstream of a light source as described above, advantageously, shift control can be easily performed because the quantity of light of the light source is large and there is no modulation spectrum. The optical frequency shifter (15) may be arranged immediately downstream of the optical modulator (14).

According to another embodiment of the present invention, similar advantages can be obtained in the following structure: Controlling a voltage applied to the main Mach-Zehnder (50) fixes the phase difference between the optical waveguides (52) and (53) therein to $|\pi/2|$. On this condition, the sub Mach-Zehnders (60) and (70) have polarities opposite to each other.

In other words, according to the foregoing embodiment, the sub Mach-Zehnders (60) and (70) each have the phase difference of $\pi$ as shown in FIGS. 8 and 9. According to the present embodiment, the phase difference in one sub Mach-Zehnder may be set to $-\pi$ and that in the other one may be set to $+\pi$ such that the phase difference in the main Mach-Zehnder is equal to $|\pi/2|$.

According to further another embodiment, a pulse generator may be used in place of the DC power supply (16). In this case, the optical frequency shifter is driven in accordance with a high-speed pulse train, so that radio signals may be subjected to fast frequency hopping based on a pulse frequency, a pulse pattern, and a pulse voltage. Since the frequency diversity effect can be obtained due to frequency hopping in a manner similar to the characteristics of received power of the receiving terminal (30) shown in FIG. 4, a tolerance to the multi-path environment can be provided.

In the method for causing frequency hopping, a well-known hopping synthesizer may be used instead of the microwave oscillator (17) for RF signal oscillation. According to the present invention, since the amount of shift depends on the frequency f_s, this frequency may be hopped. It is made possible that both of a carrier component and a modulating signal component in a radio frequency band are similarly hopped.

The present invention has the following advantages:

According to the present invention, by changing an optical frequency of a laser light source, it can shift a frequency to any level and switch a radio frequency channel. Particularly, in the use of the optical frequency shifter, it is unnecessary to provide a complicated optical frequency control function for the laser light source. This contributes to switching a radio frequency channel with high stability at high speed. In this case, a circuit for driving the optical frequency shifter includes no parts for use in the millimeter-wave band, thus reducing the cost of the circuit.

In the use of the above-described double frequency shift, even when a low frequency input signal is used as an oscillation signal to be supplied to the optical frequency shifter, a frequency channel can be widely switched.

In addition, since frequency hopping can be easily realized, when a radio propagation path is in the multi-path environment, the frequency diversity effect enables high-quality communication.

INDUSTRIAL APPLICABILITY

The present invention is applicable to a radio optical fusion communication system based on a method for switching a radio frequency channel.

The invention claimed is:

1. A method for changing a frequency in a radio optical fusion communication system including a base station and a remote antenna station, the base station being adapted to generate a modulated radio signal, to electro-optically convert the generated signal into an optical signal while the modulation mode is kept, and to transmit the converted signal to the remote antenna station over an optical fiber path, the remote antenna station being adapted to opto-electrically convert the received optical signal to extract the modulated radio signal and transmitting the signal through an antenna by radio, the base station including a first light source and a second light source for generating optical signals of different frequencies, an intermediate-frequency signal generating means for generating a modulating signal at an intermediate frequency band, a modulator for modulating the optical signal from the first light source into an unsuppressed-carrier single-sideband (SSB) or double-sideband (DSB) modulated optical signal using the intermediate-frequency signal, and an optical mixer for mixing the modulated optical signal with the optical signal from the second light source to obtain an optical transmission signal, the method comprising:

controlling the frequency of at least one of the optical signals from the first and second light sources so that the difference in frequency between the optical signals is a desired frequency of the modulated radio signal, and the frequency channel of the modulated radio signal extracted by the remote antenna station is switched, shifting the frequency of the optical signal from at least one of the first and second light sources through an optical frequency shifter provided downstream of the light source, wherein the optical frequency shifter has optical waveguides including a main Mach-Zehnder integrated with two sub Mach-Zehnders, and driving the optical frequency shifter in accordance with a predetermined frequency oscillation signal for determination of the amount of frequency shift, and the frequency is shifted as much as the frequency of the oscillation signal by changing a voltage applied to the optical frequency shifter such that the optical waveguides have predetermined phase differences therebetween.

2. The method for changing a frequency in the radio optical fusion communication system according to claim 1, further comprising:

setting wherein the predetermined phase difference between the waveguides in each sub Mach-Zehnder to +.pi. or −.pi., and applying a voltage such that the predetermined phase difference between the waveguides in the main Mach-Zehnder is reversed between +.pi./2 and −.pi./2, and the frequency of the optical signal from the light source is shifted in each of upper and lower sidebands as much as the predetermined frequency to obtain the amount of frequency shift that is twice as much as the predetermined frequency.

3. The method for changing a frequency in the radio optical fusion communication system according to claim 1, further comprising:

setting the predetermined phase difference between the waveguides in the main Mach-Zehnder to +.pi./2 or −.pi/2, and applying a voltage such that the predetermined phase difference between the waveguides in each sub Mach-Zehnder is reversed between +.pi. and −.pi., and the frequency of the optical signal from the light source is shifted in each of upper and lower sidebands as much as the predetermined frequency to obtain the amount of frequency shift that is twice as much as the predetermined frequency.

4. The method for changing a frequency in the radio optical fusion communication system according to any one of claims 1 to 3, wherein the applied voltage includes a pulse train having a predetermined pulse frequency, pulse pattern, and pulse voltage to hop the frequency of the modulated radio signal.

5. The method for changing a frequency in the radio optical fusion communication system according to any one of claims 1 to 3, further comprising:

hopping the predetermined frequency oscillation signal for determination of the amount of frequency shift to hop the frequency of the modulated radio signal.

6. A base station in a radio optical fusion communication system that includes the base station and a remote antenna station, the base station being adapted to generate a modulated radio signal, to electro-optically convert the generated signal into an optical signal while the modulation mode is kept, and to transmit the converted signal to the remote antenna station over an optical fiber path, the remote antenna station being adapted to opto-electrically convert the received optical signal to extract the modulated radio signal and to transmit the signal through an antenna by radio, the base station comprising: a first light source and a second light source for generating optical signals of different frequencies; an intermediate-frequency signal generating means for generating a modulating signal at an intermediate frequency band; modulator for modulating the optical signal from the first light source into an unsuppressed-carrier single-sideband (SSB) or double-sideband (DSB) modulated optical signal using the intermediate-frequency signal; an optical mixer for mixing the modulated optical signal with the optical signal from the second light source to obtain an optical transmission signal; control means for controlling the frequency of at least one of the optical signals from the first and second light sources so that the difference in frequency between the optical signals is a desired frequency of the modulated radio signal and the frequency channel of the modulated radio signal extracted by the remote antenna station is switched, and an optical frequency shifter, provided downstream of at least one of the first and second light sources, for shifting the frequency of the optical signal from the light source, wherein the optical frequency shifter has optical waveguides including a main Mach-Zehnder integrated with two sub Mach-Zehnders, each sub Mach-Zehnder includes an electrode which is supplied predetermined oscillation signal and voltage for determination of the amount of frequency shift, the main Mach-Zehnder includes an electrode which is supplied predetermined voltage, wherein the optical frequency shifter is adapted to be driven in accordance with a predetermined frequency oscillation signal for determination of the amount of frequency shift, and wherein the frequency is adapted to be shifted as much as the frequency of the oscillation signal by changing a voltage applied to the optical frequency shifter such that the optical waveguides have predetermined phase differences therebetween.

7. The base station in the radio optical fusion communication system according to claim 6, wherein the predetermined phase difference between the waveguides in each sub Mach-Zehnder is set to +.pi. or −.pi., further comprising:

means for applying a voltage such that the predetermined phase difference between the waveguides in the main Mach-Zehnder is reversed between +.pi./2 and −.pi./2, and the frequency of the optical signal from the light source is shifted in each of upper and lower sidebands as much as the predetermined frequency to obtain the amount of frequency shift that is twice as much as the predetermined frequency.

8. The base station in the radio optical fusion communication system according to claim 6, wherein the predetermined phase difference between the waveguides in the main Mach-Zehnder is set to +.pi./2 or −.pi./2, further comprising:

means for applying a voltage such that the predetermined phase difference between the waveguides in each sub Mach-Zehnder is reversed between +.pi. and −.pi., and the frequency of the optical signal from the light source is shifted in each of upper and lower sidebands as much as the predetermined frequency to obtain the amount of frequency shift that is twice as much as the predetermined frequency.

9. The base station in the radio optical fusion communication system according to any one of claims 6 to 8, wherein the applied voltage includes a pulse train having a predetermined pulse frequency, pulse pattern, and pulse voltage to hop the frequency of the modulated radio signal.

10. The base station in the radio optical fusion communication system according to any one of claims 6 to 8, further comprising:

means for hopping the predetermined frequency oscillation signal for determination of the amount of frequency shift to hop the frequency of the modulated radio signal.

* * * * *